US012151669B2

(12) United States Patent
Hosoi et al.

(10) Patent No.: US 12,151,669 B2
(45) Date of Patent: Nov. 26, 2024

(54) CONTROL DEVICE FOR VEHICLE DRIVE DEVICE

(71) Applicant: AISIN CORPORATION, Kariya (JP)

(72) Inventors: Nobuhiro Hosoi, Anjo (JP); Daiki Sugimoto, Kariya (JP)

(73) Assignee: AISIN CORPORATION, Kariya (JP)

( * ) Notice: Subject to any disclaimer, the term of this patent is extended or adjusted under 35 U.S.C. 154(b) by 967 days.

(21) Appl. No.: 17/266,218

(22) PCT Filed: Aug. 22, 2019

(86) PCT No.: PCT/JP2019/032791
§ 371 (c)(1),
(2) Date: Feb. 5, 2021

(87) PCT Pub. No.: WO2020/066387
PCT Pub. Date: Apr. 2, 2020

(65) Prior Publication Data
US 2021/0309209 A1    Oct. 7, 2021

(30) Foreign Application Priority Data

Sep. 27, 2018    (JP) .................................. 2018181842

(51) Int. Cl.
*H02P 1/54* (2006.01)
*B60W 10/02* (2006.01)
(Continued)

(52) U.S. Cl.
CPC ............ *B60W 20/30* (2013.01); *B60W 10/02* (2013.01); *B60W 10/06* (2013.01); *B60W 10/08* (2013.01);
(Continued)

(58) Field of Classification Search
CPC .. H02P 29/032; H02P 29/027; H02P 2205/05; H02P 3/18; H02P 6/08;
(Continued)

(56) References Cited

U.S. PATENT DOCUMENTS

2014/0024492 A1    1/2014  Dextreit
2014/0368142 A1    12/2014 Uchida
(Continued)

FOREIGN PATENT DOCUMENTS

CN    106184587 A    * 12/2016    .............. B60L 15/20
JP    09-107602 A    4/1997
(Continued)

OTHER PUBLICATIONS

Supplementary European Search Report dated Aug. 12, 2021 from the European Patent Office in EP application No. 19867608.2.
(Continued)

*Primary Examiner* — Karen Masih
(74) *Attorney, Agent, or Firm* — Sughrue Mion, PLLC

(57) ABSTRACT

A control target for a control device (10) is a vehicle drive device (1) including a rotating electrical machine (MG), and the control device (10) includes: an actual rotational speed obtaining part (14) that obtains an actual rotational speed (Nm) which is an actual rotational speed of the rotating electrical machine (MG); an actual torque obtaining part (15) that obtains actual torque (Tm) which is actual torque of the rotating electrical machine (MG); and a determining part (16) that determines a state of the rotating electrical machine (MG). The determining part (16) determines that the state of the rotating electrical machine (MG) is a negative torque abnormality, when the actual torque (Tm) has a negative value smaller than a torque threshold value
(Continued)

(THt) set based on a relationship between the actual rotational speed (Nm) and target torque (Tmt) of the rotating electrical machine (MG).

18 Claims, 7 Drawing Sheets

(51) Int. Cl.
  *B60W 10/06* (2006.01)
  *B60W 10/08* (2006.01)
  *B60W 10/11* (2012.01)
  *B60W 20/15* (2016.01)
  *B60W 20/30* (2016.01)

(52) U.S. Cl.
  CPC ............ *B60W 10/11* (2013.01); *B60W 20/15* (2016.01); *B60W 2510/104* (2013.01); *B60W 2710/021* (2013.01); *B60W 2710/081* (2013.01); *B60W 2710/083* (2013.01); *B60W 2710/1005* (2013.01)

(58) Field of Classification Search
  CPC ..... H02P 29/024; G05B 19/048; G05B 17/02; G05B 23/025; B60W 20/30; B60W 10/06; B60W 10/08; B60W 2510/104; B60W 2710/081; B60W 2710/083; B60W 2710/1005
  See application file for complete search history.

(56) References Cited

U.S. PATENT DOCUMENTS

2015/0123577 A1    5/2015  Omata et al.
2018/0105158 A1*   4/2018  Namuduri ........... B60W 40/076

FOREIGN PATENT DOCUMENTS

| JP | 2012-257360 A | 12/2012 |
| JP | 2014-093849 A | 5/2014 |
| JP | 2014-241690 A | 12/2014 |
| JP | 2018-020773 A | 2/2018 |

OTHER PUBLICATIONS

International Search Report of PCT/JP2019/032791 dated Nov. 12, 2019 [PCT/ISA/210].

* cited by examiner

*FIG. 4*

|  | $Nm < 0$ | $Nm \geqq 0$ $(Nm \leqq THn)$ |
|---|---|---|
| $Tmt \geqq 0$ | $Tm < THt1$ | $Tm < THt2$ |
| $Tmt < 0$ | $Tm < THt3$ | $Tm < THt4$ |

$THt2 = a \cdot Nm + THt1 \ (a<0)$ $THt3 = Tmt + THt1$ $THt4 = Tmt + THt2$ $\quad = Tmt + a \cdot Nm + THt1 \ (a<0)$

CONTROL DEVICE FOR VEHICLE DRIVE DEVICE

CROSS REFERENCE TO RELATED APPLICATIONS

This application is a National Stage of International Application No. PCT/JP2019/032791 filed on Aug. 22, 2019, claiming the benefit of priority from Japanese Patent Application No. 2018-181842 filed on Sep. 27, 2018, the entire contents of which are incorporated herein by reference.

TECHNICAL FIELD

The present disclosure relates to a control device whose control target is a vehicle drive device including a rotating electrical machine.

BACKGROUND ART

Conventionally, a technique for determining an abnormality in a rotating electrical machine in a vehicle drive device having a configuration such as that described above is publicly known. For example, the following Patent Literature 1 discloses a technique in which when, during rotation of a rotating electrical machine, phase current supplied to the rotating electrical machine exceeds an allowable value, it is determined that an overcurrent abnormality has occurred, and control is performed to reduce the rotational speed of the rotating electrical machine.

Meanwhile, when some kind of failure has occurred in a vehicle drive device having a configuration such as that described above, the possibility that a rotating electrical machine outputs an unintended negative torque is not zero. When such an unintended negative torque is generated in the rotating electrical machine, there has been a possibility of occurrence of an event in which the rotational speed of the rotating electrical machine rotating in a forward direction suddenly decreases, causing reverse rotation of the rotating electrical machine, and an event in which the rotational speed of the rotating electrical machine rotating in a reverse direction further increases in a negative direction. When such events have occurred, traveling of a vehicle may become unstable. However, the technique of Patent Literature 1 has not taken into account such events.

CITATIONS LIST

Patent Literature

Patent Literature 1: JP 2014-241690 A (FIG. 13)

SUMMARY OF THE DISCLOSURE

Technical Problems

Hence, it is desired to implement a control device for a vehicle drive device that can appropriately determine generation of a negative torque that may cause unstable traveling of a vehicle in a rotating electrical machine.

Solutions to Problems

A characteristic configuration of a control device for a vehicle drive device in view of the above description is such that the control device is a control device whose control target is a vehicle drive device including a rotating electrical machine, the control device including:
an actual rotational speed obtaining part that obtains an actual rotational speed, the actual rotational speed being an actual rotational speed of the rotating electrical machine;
an actual torque obtaining part that obtains actual torque, the actual torque being actual torque of the rotating electrical machine; and
a determining part that determines a state of the rotating electrical machine, and
the determining part determines that the state of the rotating electrical machine is a negative torque abnormality, when the actual torque has a negative value smaller than a torque threshold value set based on a relationship between the actual rotational speed and target torque of the rotating electrical machine.

According to the characteristic configuration, the torque threshold value for determining a state of the rotating electrical machine is set based on a relationship between the actual rotational speed and target torque of the rotating electrical machine. Hence, whatever the values of the actual rotational speed and target torque of the rotating electrical machine, a negative torque abnormality can be appropriately determined based on the actual rotational speed and target torque of the rotating electrical machine. Therefore, generation of a negative torque that may cause unstable traveling of a vehicle in the rotating electrical machine can be appropriately determined.

A characteristic configuration of a control device for a vehicle drive device in view of the above description is such that the control device is a control device whose control target is a vehicle drive device including a rotating electrical machine, the control device including:
an actual rotational speed obtaining part that obtains an actual rotational speed, the actual rotational speed being an actual rotational speed of the rotating electrical machine;
an actual torque obtaining part that obtains actual torque, the actual torque being actual torque of the rotating electrical machine; and
a determining part that determines a state of the rotating electrical machine, and
the determining part performs rotating electrical machine stop control that stops the rotating electrical machine, when the actual torque has a negative value smaller than a torque threshold value set based on a relationship between the actual rotational speed and target torque of the rotating electrical machine.

According to the characteristic configuration, the torque threshold value for determining a state of the rotating electrical machine is set based on a relationship between the actual rotational speed and target torque of the rotating electrical machine. Hence, whatever the values of the actual rotational speed and target torque of the rotating electrical machine, generation of a negative torque that may cause unstable traveling of a vehicle in the rotating electrical machine can be appropriately determined based on the actual rotational speed and target torque of the rotating electrical machine. When the actual torque of the rotating electrical machine has a negative value smaller than the torque threshold value, rotating electrical machine stop control that stops the rotating electrical machine is performed. By this, drive power transmitted from the rotating electrical machine to wheels can be reduced. Therefore, even when an unintended negative torque is generated in the rotating electrical machine, unstable traveling of the vehicle can be avoided.

BRIEF DESCRIPTION OF DRAWINGS

FIG. 4 is a diagram showing a relationship between torque threshold values and the actual rotational speed and actual torque of a rotating electrical machine.

DESCRIPTION OF EMBODIMENTS

In the following, a control device 10 for a vehicle drive device 1 according to an embodiment will be described with reference to the drawings. The control device 10 is a device whose control target is the vehicle drive device 1. The control device 10 together with the vehicle drive device 1 is mounted on a vehicle. In the present embodiment, an internal combustion engine control device 20 is also mounted on the vehicle. The internal combustion engine control device 20 is a device that controls an internal combustion engine ENG serving as a drive power source.

1. Configuration of the Vehicle Drive Device

Figure 1:
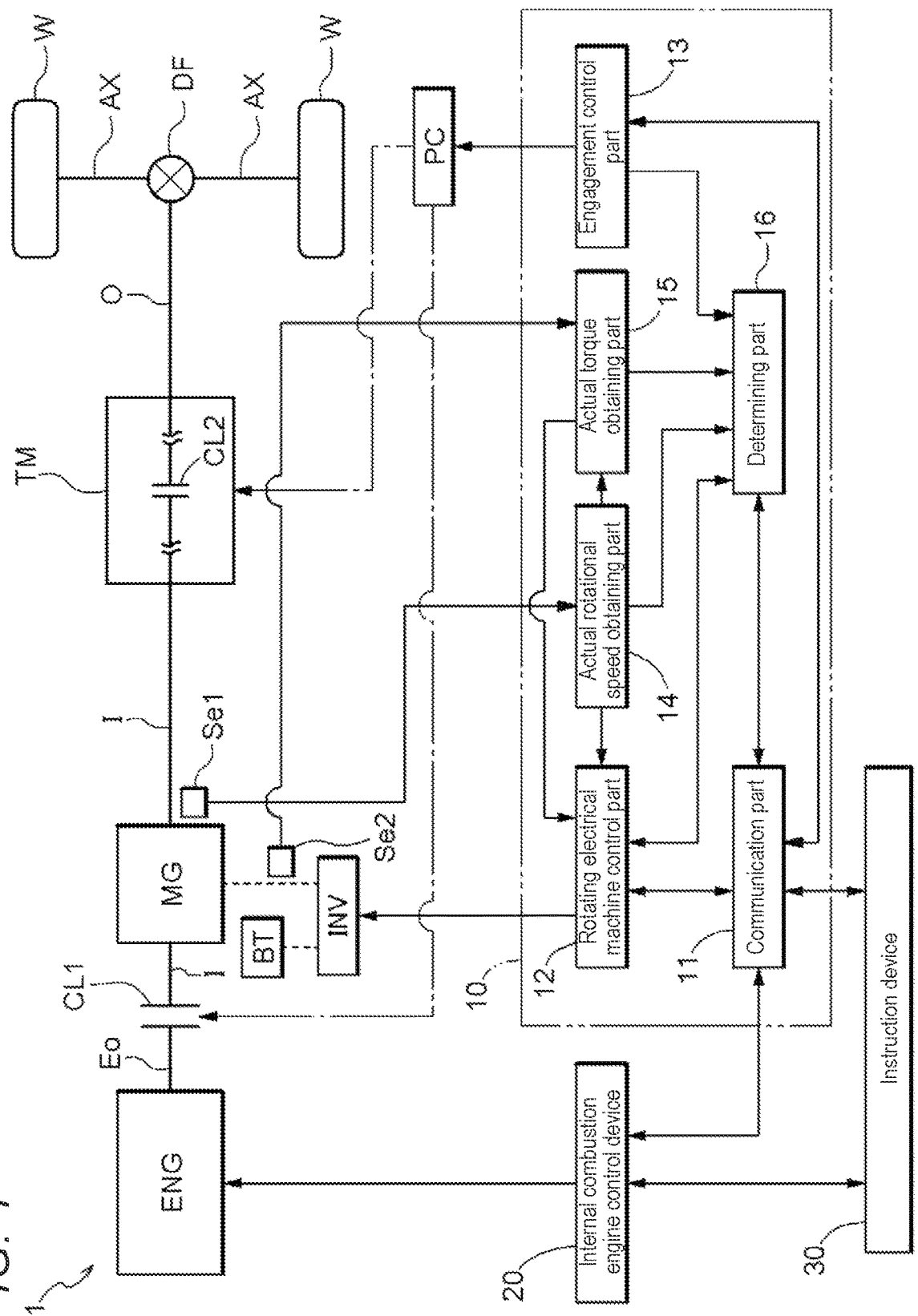
FIG. 1 is a schematic diagram showing configurations of a vehicle drive device and a control device according to an embodiment.

First, a configuration of the vehicle drive device 1 will be described. As shown in FIG. 1, the vehicle drive device 1 includes a rotating electrical machine MG. In the present embodiment, the vehicle drive device 1 further includes an input shaft I drive-coupled to the internal combustion engine ENG; an output shaft O drive-coupled to wheels W; a first engagement device CL1 that selectively drive-couples the internal combustion engine ENG to the rotating electrical machine MG; and a transmission TM that changes the speed of rotation of the input shaft I and transmits the rotation to the output shaft O. In a power transmission path connecting the input shaft I to the output shaft O, the first engagement device CL1, the rotating electrical machine MG, and the transmission TM are disposed in this order from an internal combustion engine ENG side. Note that in the present embodiment, the input shaft I corresponds to an "input member" and the output shaft O corresponds to an "output member".

Here, the term "drive-coupled" indicates a state in which two rotating elements are coupled together such that they can transmit drive power, and includes a state in which the two rotating elements are coupled together such that they rotate together or a state in which the two rotating elements are coupled together through one or two or more power transmission members such that they can transmit drive power. Such power transmission members include various types of members (e.g., shafts, gear mechanisms, belts, and chains) that transmit rotation at the same speed or at a changed speed. Note that the power transmission members may include engagement devices (e.g., friction engagement devices and mesh engagement devices) that selectively transmit rotation and drive power.

The internal combustion engine ENG is a prime mover (a gasoline engine, a diesel engine, etc.) that is driven by fuel combustion to take out power. In the present embodiment, an internal combustion engine output shaft Eo such as a crankshaft of the internal combustion engine ENG is selectively drive-coupled to the input shaft I through the first engagement device CL1. The internal combustion engine output shaft Eo is provided with a damper (depiction is omitted) that damps fluctuation of torque to be transmitted.

The rotating electrical machine MG includes a stator and a rotor that is rotatably supported on the stator. The rotor of the rotating electrical machine MG is drive-coupled to the input shaft I so as to rotate together with the input shaft I. That is, in the present embodiment, the configuration is such that both the internal combustion engine ENG and the rotating electrical machine MG are drive-coupled to the input shaft I.

As shown in FIG. 1, the rotating electrical machine MG is electrically connected to a battery BT through an inverter device INV that performs DC-AC conversion. The rotating electrical machine MG has a function of a motor that receives electric power supply and thereby generates power and a function of a generator that receives power supply and thereby generates electric power. That is, the rotating electrical machine MG performs motoring by receiving electric power supply from the battery BT through the inverter device INV, or stores electric power generated by torque of the internal combustion engine ENG or inertial force of the vehicle in the battery BT through the inverter device INV. Note that in the present embodiment, the battery BT corresponds to a "direct-current power supply".

Figure 2:
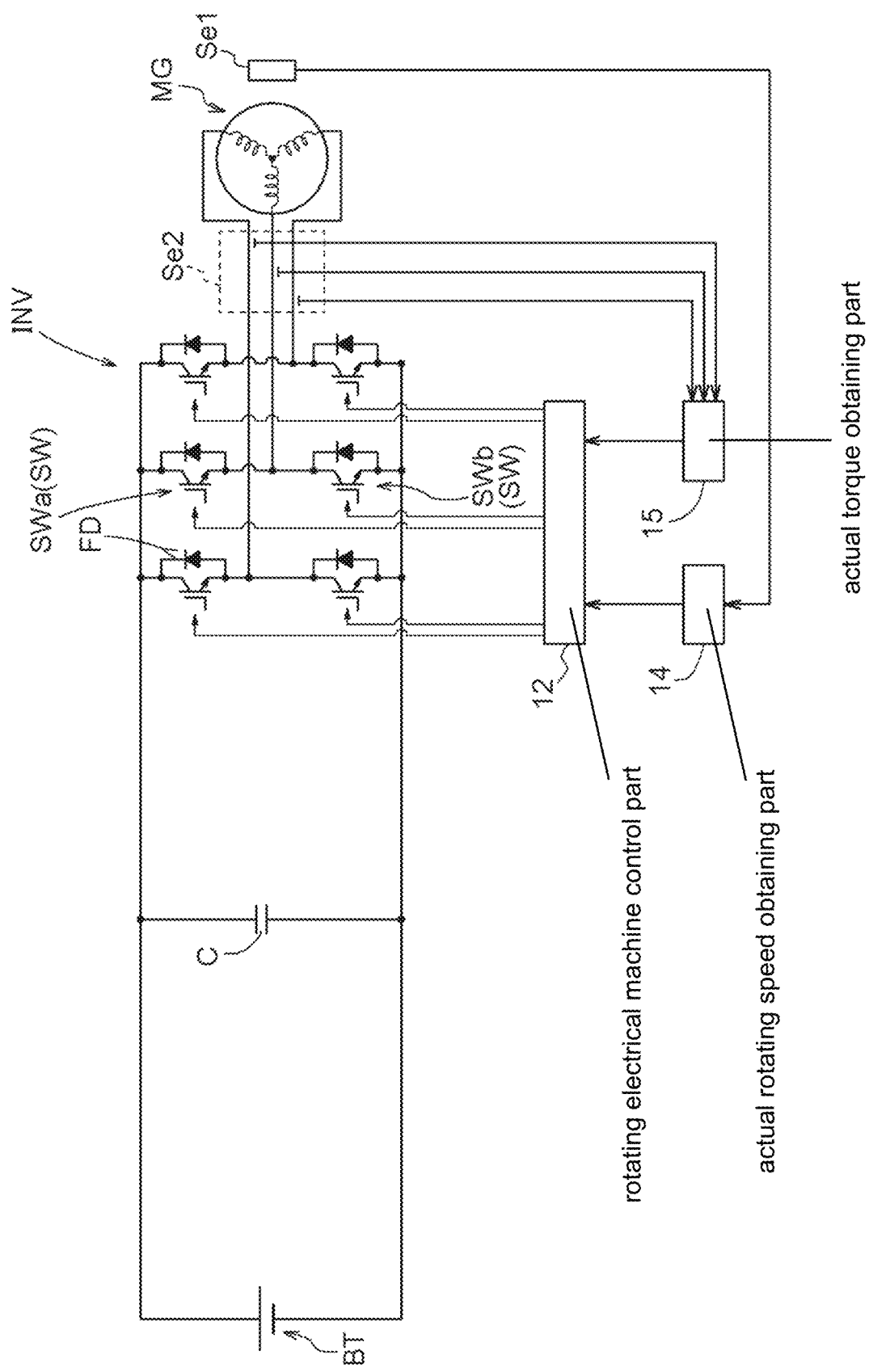
FIG. 2 is a schematic diagram showing a circuit of an inverter device.

As shown in FIG. 2, the inverter device INV is connected to the battery BT and connected to the rotating electrical machine MG to convert electric power between direct current of the battery BT and multiphase (here, three phases) alternating current of the rotating electrical machine. In an example shown in the drawing, the inverter device INV includes a direct-current link capacitor C that smooths voltage on a direct-current side of an inverter circuit.

The inverter device INV includes a plurality of switching elements SW. For the switching elements SW, it is preferred to apply power semiconductor devices that can operate at high frequencies, such as insulated gate bipolar transistors (IGBTs), power metal oxide semiconductor field effect transistors (MOSFETs), silicon carbide-metal oxide semiconductor FETs (SiC-MOSFETs), SiC-static induction transistors (SiC-SITs), and gallium nitride-MOSFETs (GaN-MOSFETs). Here, as the switching elements SW, IGBTs are applied.

The plurality of switching elements SW include a plurality of upper-stage-side switching elements SWa connected to a positive polarity side of the battery BT; and a plurality of lower-stage-side switching elements SWb connected to a negative polarity side of the battery BT. Each of the plurality of switching elements SW is provided with a freewheeling diode FD in parallel thereto, with a direction going from a negative polarity to a positive polarity (a direction going from a lower-stage side to an upper-stage side) being a forward direction. Switching control of the plurality of switching elements SW is performed by a rotating electrical machine control part 12 which will be described later.

As shown in FIG. 1, the transmission TM includes one or more second engagement devices CL2 that are brought into an engaged state when a shift speed is formed. The transmission TM forms a shift speed determined based on the states of engagement of the second engagement devices CL2, changes the speed of rotation of the input shaft I at a gear ratio determined based on the shift speed, and transmits the rotation to the output shaft O. Torque transmitted from the transmission TM to the output shaft O is distributed to a plurality of (two in this example) axles AX through a differential gear device DF and transmitted to the wheels W drive-coupled to the respective axles AX.

In the present embodiment, the first engagement device CL1 and the second engagement devices CL2 each are a hydraulic actuated friction engagement device. A friction engagement device is configured such that the state of engagement is controlled based on hydraulic pressure supplied to the friction engagement device. The friction engagement device transmits torque between a pair of fiction members included in the friction engagement device by friction between the pair of friction members. When there is a rotational speed difference (slippage) between the pair of friction members of the friction engagement device, torque (slip torque) whose magnitude is transmission torque capacity is transmitted by dynamic friction from a member with a higher rotational speed to a member with a lower rotational speed. When there is no rotational speed difference (slippage) between the pair of friction members of the friction engagement device, the friction engagement device transmits, by static friction, torque acting between the pair of friction members, with the magnitude of transmission torque capacity being an upper limit.

Here, the transmission torque capacity is the magnitude of maximum torque that can be transmitted by the friction engagement device by friction. The magnitude of the transmission torque capacity changes in proportion to the engagement pressure of the friction engagement device. The engagement pressure is pressure that presses a friction member on an input side and a friction member on an output side against each other. The engagement pressure changes in proportion to the magnitude of supplied hydraulic pressure. That is, the magnitude of the transmission torque capacity changes in proportion to the magnitude of hydraulic pressure supplied to the friction engagement device.

The friction engagement device includes a return spring, and the friction members are biased toward a disengagement side by reaction force of the return spring. When force generated by hydraulic pressure that is supplied to a hydraulic cylinder of the friction engagement device exceeds the reaction force of the return spring, transmission torque capacity starts to be generated in the friction engagement device, by which the friction engagement device changes from a disengaged state to an engaged state. The hydraulic pressure at which transmission torque capacity starts to be generated is referred to as stroke end pressure. The friction engagement device is configured such that after supplied hydraulic pressure exceeds the stroke end pressure, transmission torque capacity of the friction engagement device increases in proportion to an increase in the hydraulic pressure. Note that the friction engagement device may be structured such that the friction engagement device does not include a return spring and is controlled by differential pressure of hydraulic pressure applied to both sides of a piston of the hydraulic cylinder.

Here, the "engaged state" is a state in which transmission torque capacity is generated in the friction engagement device, and includes a slip-engaged state and a direct-coupling engaged state. The "slip-engaged state" is an engaged state in which there is a rotational speed difference (slippage) between the pair of friction members of the friction engagement device. The "direct-coupling engaged state" is an engaged state in which there is no rotational speed difference (slippage) between the pair of friction members of the friction engagement device. In addition, the "disengaged state" is a state in which transmission torque capacity is not generated in the friction engagement device.

2. Configuration of a Hydraulic Pressure Control System

Figure 3:
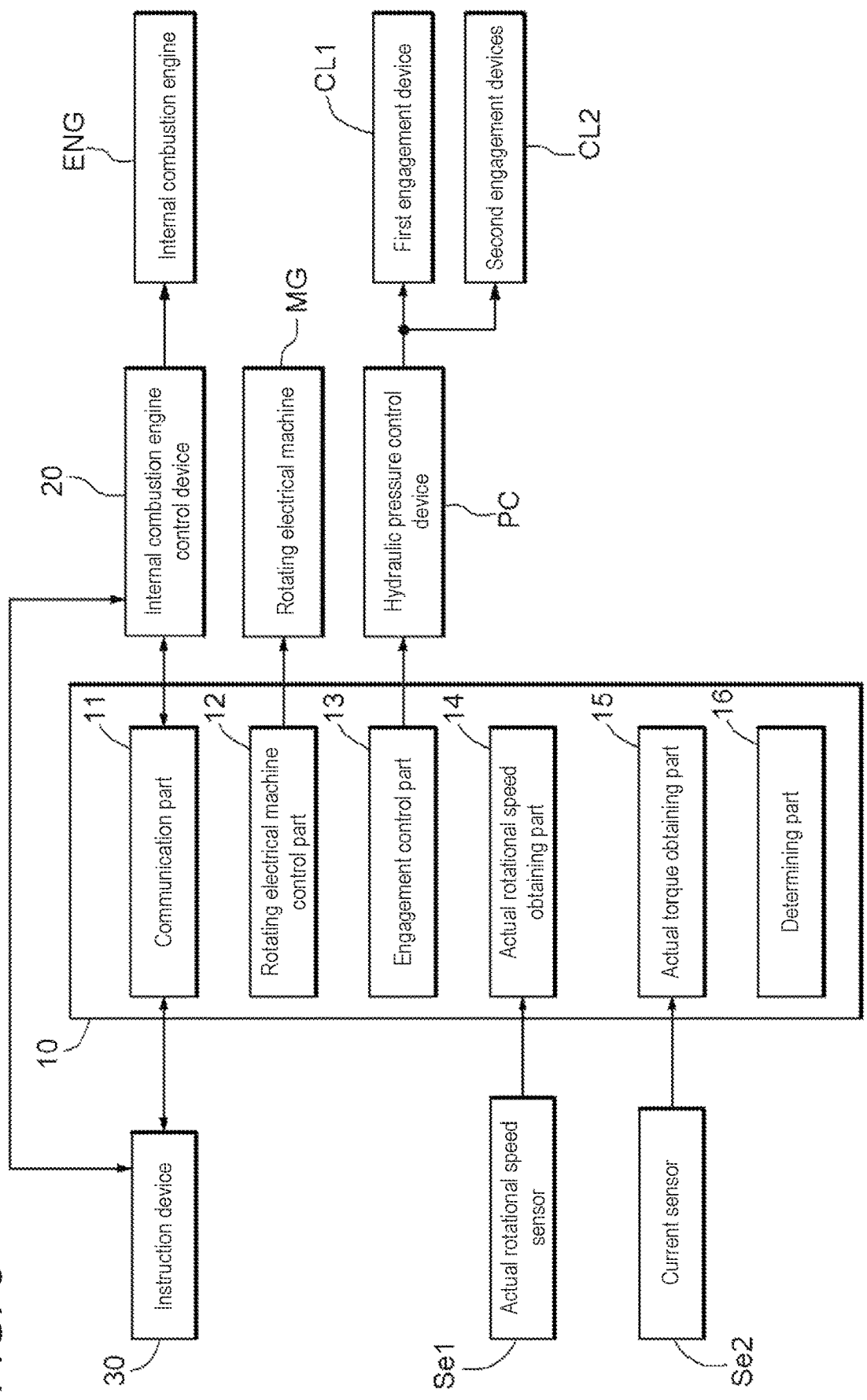
FIG. 3 is a block diagram showing a configuration of the control device according to the embodiment.

As shown in FIGS. 1 and 3, a hydraulic pressure control system of the vehicle drive device 1 includes a hydraulic pressure control device PC for regulating the hydraulic pressure of hydraulic oil supplied from a hydraulic pump which is driven by drive power sources (in the present embodiment, the internal combustion engine ENG and the rotating electrical machine MG) of the vehicle or a dedicated motor, to a predetermined pressure. Though a detailed description is omitted here, the hydraulic pressure control device PC regulates the hydraulic pressure of hydraulic oil to one or two or more predetermined pressures by regulating the amount of hydraulic oil drained from one or two or more regulating valves by regulating the degrees of opening of the regulating valves based on a signal pressure from a hydraulic pressure control valve such as a linear solenoid valve for regulating hydraulic pressure. The hydraulic oil whose hydraulic pressure has been regulated to the predetermined pressures is supplied to the first engagement device CL1 and the second engagement devices CL2 at respective required levels of hydraulic pressure.

3. Configurations of the Control Devices

Next, configurations of the control device 10 that controls the vehicle drive device 1 and the internal combustion engine control device 20 that controls the internal combustion engine ENG will be described.

The control device 10 and the internal combustion engine control device 20 each include, as a core member, an arithmetic processing device such as a CPU and include storage devices such as a random access memory (RAM) that allows the arithmetic processing device to read data therefrom and to write data thereinto and a read only memory (ROM) that allows the arithmetic processing device to read data therefrom. Furthermore, the control device 10 and the internal combustion engine control device 20 each include software (programs) stored in the storage devices, hardware provided separately such as an arithmetic circuit, or both of them.

As shown in FIGS. 1 and 3, the control device 10 includes a communication part 11, a rotating electrical machine control part 12, an engagement control part 13, an actual rotational speed obtaining part 14, an actual torque obtaining part 15, and a determining part 16.

The communication part 11 is configured to be able to communicate with an instruction device 30 which is a host control device for the control device 10 and the internal combustion engine control device 20. The communication part 11 receives an instruction for the rotating electrical machine control part 12, an instruction for the engagement control part 13, etc., from the instruction device 30. In addition, the communication part 11 is configured to be able to communicate with the rotating electrical machine control part 12, the engagement control part 13, and the internal combustion engine control device 20, too. Note that the internal combustion engine control device 20 and the instruction device 30 may be included in the same device.

The rotating electrical machine control part 12 controls the rotating electrical machine MG. When MG target torque Tmt which is target torque required for the rotating electrical machine MG is instructed by the instruction device 30 through the communication part 11, the rotating electrical machine control part 12 controls the rotating electrical machine MG to output the MG target torque Tmt. In addition, when a target rotational speed required for the rotating electrical machine MG is instructed by the instruction device 30 through the communication part 11, the rotating electrical machine control part 12 controls the rotating electrical machine MG to achieve the target rotational speed. Specifically, the rotating electrical machine control part 12 controls the output torque and rotational speed of the rotating electrical machine MG by controlling the plurality of switching elements SW in the inverter device INV.

The engagement control part 13 controls the state of engagement of the first engagement device CL1. In the present embodiment, the engagement control part 13 controls a signal value supplied to the hydraulic pressure control valve included in the hydraulic pressure control device PC such that hydraulic pressure supplied to the first engagement device CL1 matches target hydraulic pressure (hydraulic pressure instruction) of the first engagement device CL1 that is instructed by the instruction device 30.

In addition, the engagement control part 13 controls the state of the transmission TM by controlling the states of engagement of the second engagement devices CL2 in the transmission TM. That is, the engagement control part 13 controls, through the hydraulic pressure control device PC, hydraulic pressure supplied to the second engagement devices CL2, and thereby allows the transmission TM to form a target shift speed instructed by the instruction device 30. Specifically, the engagement control part 13 provides an instruction about target hydraulic pressure (hydraulic pressure instruction) of the second engagement devices CL2 to the hydraulic pressure control device PC, and the hydraulic pressure control device PC supplies hydraulic pressure determined based on the instructed target hydraulic pressure (hydraulic pressure instruction) to the second engagement devices CL2. In the present embodiment, the engagement control part 13 controls hydraulic pressure to be supplied to the second engagement devices CL2, by controlling a signal value supplied to the hydraulic pressure control valve included in the hydraulic pressure control device PC.

The actual rotational speed obtaining part 14 obtains an MG actual rotational speed Nm which is the actual rotational speed of the rotating electrical machine MG. As described previously, since the rotor of the rotating electrical machine MG is integrally drive-coupled to the input shaft I, the MG actual rotational speed Nm corresponds to the actual rotational speed of the input shaft I. In the present embodiment, the actual rotational speed obtaining part 14 calculates the actual rotational speed (angular speed) of the input shaft I based on an output signal from an actual rotational speed sensor Se1. The actual rotational speed sensor Se1 is a sensor for detecting the actual rotational speed of the input shaft I, i.e., the MG actual rotational speed Nm. For the actual rotational speed sensor Se1, a resolver, a sensor using a magnetoresistive element (MR element), a sensor using a Hall element, etc., can be adopted. Here, the actual rotational speed sensor Se1 is a resolver included in the rotating electrical machine MG. Thus, the actual rotational speed obtaining part 14 detects the position of the rotor of the rotating electrical machine MG by converting an output signal from the actual rotational speed sensor Se1 into a digital signal, and calculates an MG actual rotational speed Nm based on the position of the rotor.

The actual torque obtaining part 15 obtains MG actual torque Tm which is the actual torque of the rotating electrical machine MG. In the present embodiment, the actual torque obtaining part 15 calculates actual current flowing through stator coils for the respective phases of the rotating electrical machine MG, by converting an output signal from a current sensor Se2 into a digital signal. There is a certain relationship between the actual current flowing through the stator coils for the respective phases of the rotating electrical machine MG and torque outputted from the rotating electrical machine MG. Thus, the actual torque obtaining part 15 calculates MG actual torque Tm outputted from the rotating electrical machine MG, based on the actual current and an angular speed of the input shaft I calculated by the actual rotational speed obtaining part 14.

The determining part 16 determines a state of the rotating electrical machine MG, based on the MG actual rotational speed Nm obtained by the actual rotational speed obtaining part 14, the MG actual torque Tm obtained by the actual torque obtaining part 15, etc. Detailed operation of the determining part 16 will be described later.

When a combustion start request for the internal combustion engine ENG has been made, the internal combustion engine control device 20 performs control to start combustion of the internal combustion engine ENG, for example, by starting the fuel supply and ignition of the internal combustion engine ENG. In addition, when a combustion stop instruction for the internal combustion engine ENG has been made by the instruction device 30 through the communication part 11, the internal combustion engine control device 20 brings the internal combustion engine ENG into a combustion stop state by stopping the fuel supply, ignition, etc., of the internal combustion engine ENG. Furthermore, the internal combustion engine control device 20 controls the internal combustion engine ENG to output target torque instructed by the instruction device 30 through the communication part 11 or to achieve a target rotational speed instructed by the instruction device 30 through the communication part 11.

4. Determination of a State of the Rotating Electrical Machine MG

Next, a determination of a state of the rotating electrical machine MG by the determining part 16 will be described. The determining part 16 determines that the state of the rotating electrical machine MG is a negative torque abnormality, when the MG actual torque Tm has a negative value smaller than a torque threshold value THt set based on a relationship between MG actual rotational speed Nm and MG target torque Tmt. Here, the expression "the state of the rotating electrical machine MG is a negative torque abnormality" refers to a state in which the rotating electrical machine MG is outputting torque different from the MG target torque Tmt and is outputting a negative torque that may cause unstable traveling of the vehicle.

4-1. Torque Threshold Value THt

Here, the torque threshold value THt will be described. The torque threshold value THt is set based on a relationship between MG actual rotational speed Nm and MG target torque Tmt. As shown in FIG. 4, in the present embodiment, the torque threshold value THt is set to any of a first threshold value THt1, a second threshold value THt2, a third threshold value THt3, and a fourth threshold value THt4, based on MG actual rotational speed Nm and MG target torque Tmt.

When the MG actual rotational speed Nm is smaller than zero and the MG target torque Tmt is greater than or equal to zero, the torque threshold value THt is set to the first threshold value THt1. When the MG actual torque Tm has a negative value smaller than the first threshold value THt1, the determining part 16 determines that the state of the rotating electrical machine MG is a negative torque abnormality.

When the MG actual rotational speed Nm is greater than or equal to zero and the MG target torque Tmt is greater than or equal to zero, the torque threshold value THt is set to the second threshold value THt2. When the MG actual torque Tm has a negative value smaller than the second threshold value THt2, the determining part 16 determines that the state of the rotating electrical machine MG is a negative torque abnormality. Note that in the present embodiment, when the MG actual rotational speed Nm is greater than a rotational speed threshold value THn, the determining part 16 does not determine a state of the rotating electrical machine MG. This is because if the MG actual rotational speed Nm is somewhat high, then even when an unintended negative torque is generated, there is a low possibility of the rotating electrical machine MG rotating in a reverse direction.

When the MG actual rotational speed Nm is smaller than zero and the MG target torque Tmt is smaller than zero, the torque threshold value THt is set to the third threshold value THt3. When the MG actual torque Tm has a negative value smaller than the third threshold value THt3, the determining part 16 determines that the state of the rotating electrical machine MG is a negative torque abnormality.

When the MG actual rotational speed Nm is greater than or equal to zero and the MG target torque Tmt is smaller than zero, the torque threshold value THt is set to the fourth threshold value THt4. When the MG actual torque Tm has a negative value smaller than the fourth threshold value THt4, the determining part 16 determines that the state of the rotating electrical machine MG is a negative torque abnormality.

Figure 5:
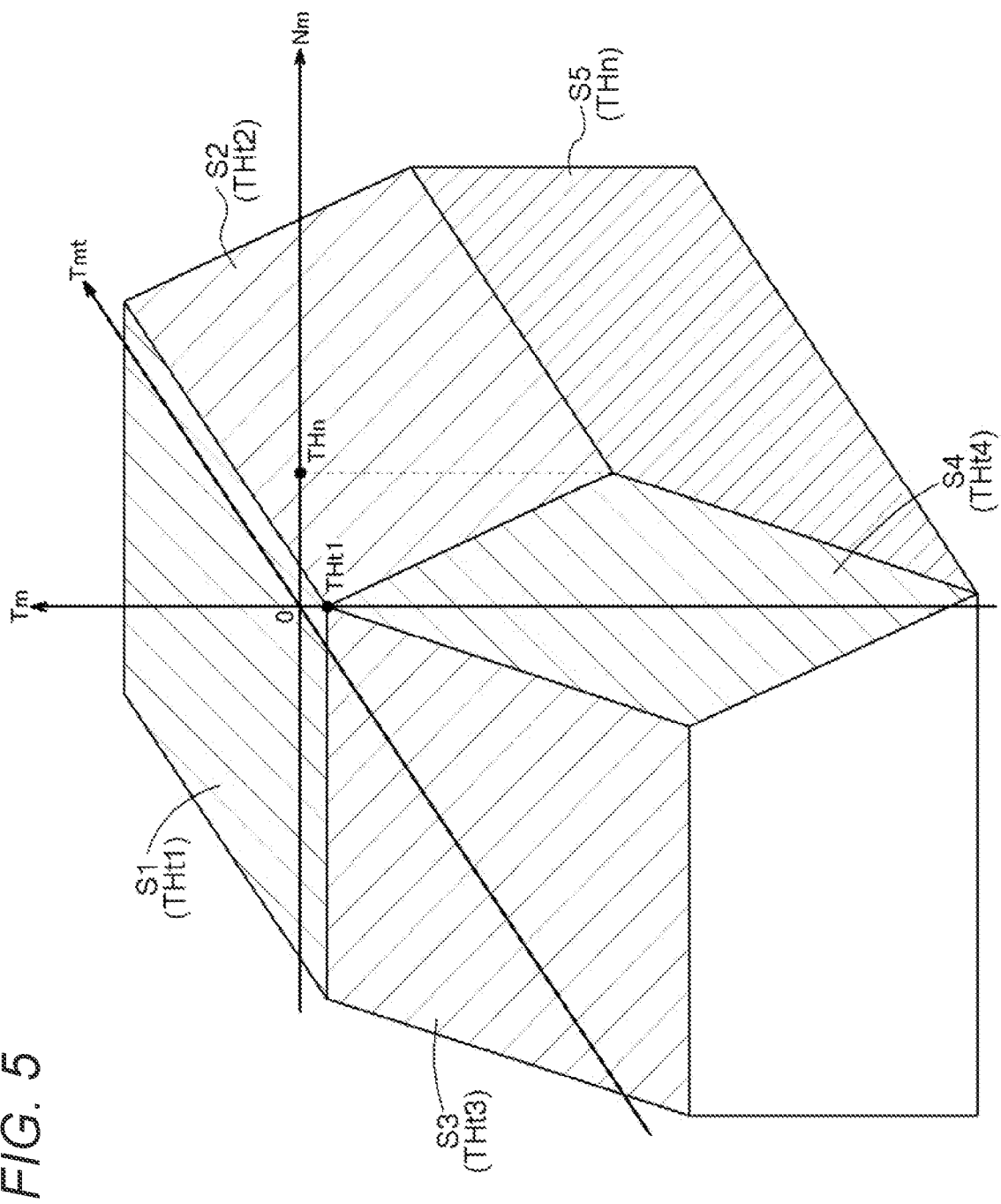
FIG. 5 is a diagram showing a three-dimensional orthogonal coordinate system representing the torque threshold values.

FIG. 5 shows a three-dimensional orthogonal coordinate system representing the threshold values THt1 to THt4. Three coordinate axes of the coordinate system are MG actual rotational speed Nm, MG target torque Tmt, and MG actual torque Tm, respectively.

In FIG. 5, a virtual plane S1 indicates the first threshold value THt1, a virtual plane S2 indicates the second threshold value THt2, a virtual plane S3 indicates the third threshold value THt3, and a virtual plane S4 indicates the fourth threshold value THt4. In addition, a virtual plane S5 indicates the rotational speed threshold value THn. Note that the upper limit of a threshold value on a positive side and lower limit of a threshold value on a negative side of the MG target torque Tmt respectively correspond to the upper limit and lower limit of torque that can be outputted from the rotating electrical machine MG, and the lower limit of a threshold value on a negative side of the MG actual rotational speed Nm corresponds to a lower limit of rotational speed at which the rotating electrical machine MG can operate.

The first threshold value THt1 is set to a constant value that does not change depending on the MG actual rotational speed Nm and the MG target torque Tmt. When the MG actual rotational speed Nm is negative and the MG target torque Tmt is positive, i.e., when the rotating electrical machine MG is outputting torque in a direction in which the rotational speed thereof decreases while the rotating electrical machine MG is rotating in a reverse direction, this situation corresponds to a situation in which the vehicle is decelerating while traveling backward. In such a situation, unintended output of a negative torque from the rotating electrical machine MG leads to unintended acceleration of the vehicle in a backward direction and thus is not desirable. Hence, in a case in which the MG actual rotational speed Nm is negative and the MG target torque Tmt is positive, regardless of the magnitudes of the MG actual rotational speed Nm and the MG target torque Tmt, when the MG actual torque Tm exceeds, in a negative direction, the constant first threshold value THt1 which is set to a negative value, it is determined that the state of the rotating electrical machine MG is a negative torque abnormality. Here, the first threshold value THt1 is set to a negative value that is slightly smaller than zero (e.g., −5 N·m), taking into account an error in MG actual torque Tm calculated by the actual torque obtaining part 15. That is, the first threshold value THt1 is set such that in a case in which the MG actual rotational speed Nm is negative, when the MG actual torque Tm that is supposed to be a positive torque under normal operating conditions has become negative, it is determined to be a negative torque abnormality even if the MG actual torque Tm is a relatively small negative torque.

The second threshold value THt2 is set to a value that does not change depending on the MG target torque Tmt, but decreases as the MG actual rotational speed Nm increases. When the MG actual rotational speed Nm is positive and the MG target torque Tmt is positive, i.e., when the rotating electrical machine MG is outputting torque in a direction in which the rotational speed thereof increases while the rotating electrical machine MG is rotating in a forward direction, this situation corresponds to a situation in which the vehicle is accelerating while traveling forward. In such a situation, when the rotating electrical machine MG unintentionally outputs a negative torque, reverse rotation of the rotating electrical machine MG is more likely to occur as the MG actual rotational speed Nm decreases, and the amount of change in rotational speed before reverse rotation occurs increases as the MG actual rotational speed Nm increases and thus reverse rotation of the rotating electrical machine MG becomes difficult to occur. Hence, in a case in which the MG actual rotational speed Nm is positive and the MG target torque Tmt is positive, regardless of the magnitude of the MG target torque Tmt, when the MG actual torque Tm exceeds, in a negative direction, the second threshold value THt2 which is set to a negative value that increases in a negative direction as the MG actual rotational speed Nm increases, it is determined that the state of the rotating electrical machine MG is a negative torque abnormality. Here, the second threshold value THt2 is represented by the following equation. Note that "a" in the equation is a preset negative value.

$$THt2 = a \cdot Nm + THt1 \ (Nm >= 0, a < 0)$$

That is, the second threshold value THt2 is set such that in a case in which the MG actual rotational speed Nm is positive, when the MG actual torque Tm that is supposed to be a positive torque under normal operating conditions has become negative, it is determined to be a negative torque abnormality on condition that a negative torque with a magnitude that may cause reverse rotation of the rotating electrical machine MG has been outputted.

The third threshold value THt3 is set to a value that does not change depending on the MG actual rotational speed Nm, but decreases as the MG target torque Tmt decreases. When the MG actual rotational speed Nm is negative and the MG target torque Tmt is negative, i.e., when the rotating electrical machine MG is outputting torque in a direction in which the rotational speed thereof increases while the rotating electrical machine MG is rotating in a reverse direction, this situation corresponds to a situation in which the vehicle is accelerating while traveling backward. In such a situation, unintended output of a negative torque larger in a negative direction than the MG target torque Tmt from the rotating electrical machine MG leads to more than necessary acceleration of the vehicle in a backward direction and thus is not desirable. Hence, in a case in which the MG actual rotational speed Nm is negative and the MG target torque Tmt is negative, regardless of the magnitude of the MG actual rotational speed Nm, when the MG actual torque Tm exceeds, in a negative direction, the third threshold value THt3 which is set to a negative value that increases in a negative direction as the MG target torque Tmt increases in a negative direction, it is determined that the state of the rotating electrical machine MG is a negative torque abnormality. Here, the third threshold value THt3 is represented by the following equation:

$$THt3 = Tmt + THt1 (Tmt < 0)$$

As described above, the first threshold value THt1 is set to a constant value. That is, the third threshold value THt3 is set such that in a case in which the MG actual rotational speed Nm is negative, when the MG actual torque Tm has become larger in a negative direction than a relatively small constant value (here, the same value as the first threshold value THt1) with respect to normal MG target torque Tmt, it is determined to be a negative torque abnormality.

The fourth threshold value THt4 is set to a value that decreases as the MG target torque Tmt decreases and that decreases as the MG actual rotational speed Nm increases. When the MG actual rotational speed Nm is positive and the MG target torque Tmt is negative, i.e., when the rotating electrical machine MG is outputting torque in a direction in which the rotational speed thereof decreases while the rotating electrical machine MG is rotating in a forward direction, this situation corresponds to a situation in which the vehicle is decelerating while traveling forward. In such a situation, unintended output of a negative torque larger in a negative direction than the MG target torque Tmt from the rotating electrical machine MG leads to greater than necessary deceleration of the vehicle and thus is not desirable. Hence, in a case in which the MG actual rotational speed Nm is positive and the MG target torque Tmt is negative, when the MG actual torque Tm exceeds, in a negative direction, the fourth threshold value THt4 which is set to a negative value that increases in a negative direction as the MG target torque Tmt increases in a negative direction and that increases in the negative direction as the MG actual rotational speed Nm increases, it is determined that the state of the rotating electrical machine MG is a negative torque abnormality. Here, the fourth threshold value THt4 is represented by the following equation:

$$THt4 = Tmt + Tht2$$
$$= Tmt + a \cdot Nm + Tht1 (Tmt < 0, Nm >= 0, a < 0)$$

That is, the fourth threshold value THt4 is set such that in a case in which the MG actual rotational speed Nm is positive, when the MG actual torque Tm has become larger in a negative direction than a specified value that increases in a negative direction as the MG actual rotational speed Nm increases, with respect to normal MG target torque Tmt, it is determined to be a negative torque abnormality. This can suppress greater than necessary deceleration of the rotating electrical machine MG rotating in a forward direction, or reverse rotation of the rotating electrical machine MG.

4-2. Flowchart

Figure 6:
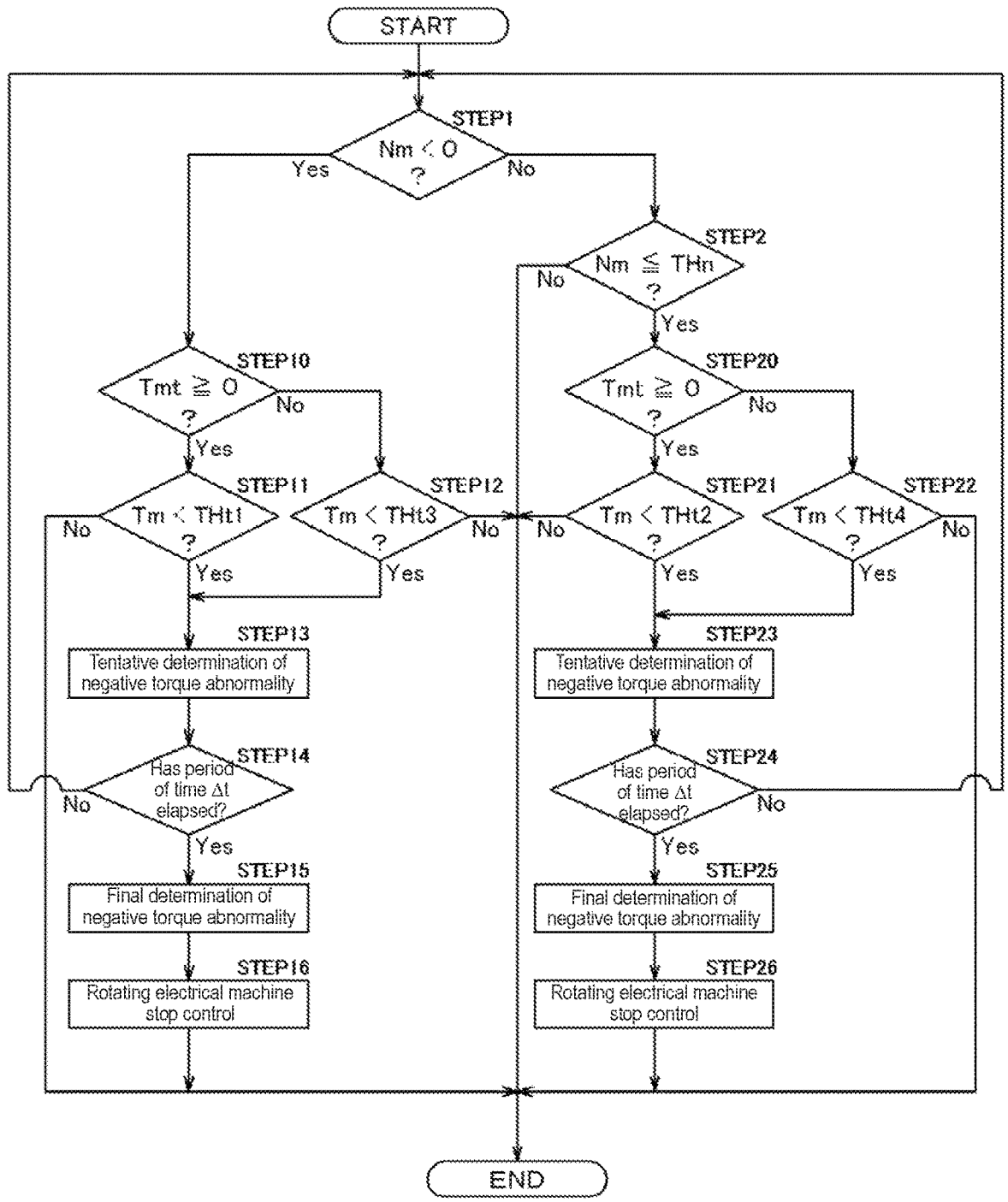
FIG. 6 is a flowchart showing a determination of a state of the rotating electrical machine by a determining part.

FIG. 6 shows a flowchart of a determination of a state of the rotating electrical machine MG by the determining part 16 according to the present embodiment. As shown in FIG. 6, first, the determining part 16 determines whether the MG actual rotational speed Nm is smaller than zero (STEP1).

If the determining part 16 determines that the MG actual rotational speed Nm is smaller than zero, the determining part 16 determines whether the MG target torque Tmt is greater than or equal to zero (STEP10).

On the other hand, if the determining part 16 determines that the MG actual rotational speed Nm is greater than or equal to zero, the determining part 16 determines whether the MG actual rotational speed Nm is less than or equal to the rotational speed threshold value THn (STEP2).

First, control performed at and after STEP10 will be described, and control performed at and after STEP2 will be described later.

If the determining part 16 determines that the MG target torque Tmt is greater than or equal to zero, the determining part 16 determines whether the MG actual torque Tm is smaller than the first threshold value THt1 (STEP11).

On the other hand, if the determining part 16 determines that the MG target torque Tmt is smaller than zero, the determining part 16 determines whether the MG actual torque Tm is smaller than the third threshold value THt3 (STEP12).

If the determining part 16 determines at STEP11 that the MG actual torque Tm is smaller than the first threshold value THt1, or determines at STEP12 that the MG actual torque Tm is smaller than the third threshold value THt3, the determining part 16 makes a tentative determination that the state of the rotating electrical machine MG is a negative torque abnormality (hereinafter, referred to as "tentative determination of a negative torque abnormality") (STEP13).

On the other hand, if the determining part 16 determines at STEP11 that the MG actual torque Tm is greater than or equal to the first threshold value THt1, or determines at STEP12 that the MG actual torque Tm is greater than or equal to the third threshold value THt3, the determining part 16 ends the determination of a state of the rotating electrical machine MG.

Subsequently, the determining part 16 determines whether a period of time Δt has elapsed from when the tentative determination of a negative torque abnormality is initially made (STEP14). If the determining part 16 determines that the period of time Δt has not elapsed from when the tentative determination of a negative torque abnormality is initially made, the determining part 16 returns to STEP1 and determines a state of the rotating electrical machine MG. On the other hand, if the "tentative determination of a negative torque abnormality" state continues even after the period of time Δt has elapsed from when the tentative determination of a negative torque abnormality is initially made, the determining part 16 makes a final determination that the state of the rotating electrical machine MG is a negative torque abnormality (hereinafter, referred to as "final determination of a negative torque abnormality") (STEP15).

After making the final determination of a negative torque abnormality, the determining part 16 performs rotating electrical machine stop control that stops the rotating electrical machine MG (STEP16). In the present embodiment, in the rotating electrical machine stop control, at least one of active short-circuit control, shutdown control, and rotating electrical machine zero-torque control is performed.

The active short-circuit control is control that brings either all of the plurality of upper-stage-side switching elements SWa or all of the plurality of lower-stage-side switching elements SWb in the inverter device INV into an on state and brings the other ones into an off state. The shutdown control is control that brings all of the plurality of upper-stage-side switching elements SWa and the plurality of lower-stage-side switching elements SWb in the inverter device INV into an off state. When the active short-circuit control or the shutdown control is performed, energy of current (flow-back current, etc.) is converted into heat, etc., in the inverter circuit, the stator coils of the rotating electrical machine MG, etc., and consumed, and accordingly, torque in a direction in which the rotation of the rotating electrical machine MG decelerates is generated.

The rotating electrical machine zero-torque control is control to allow the inverter device INV to operate such that the MG actual torque Tm reaches zero. When this control is performed, output torque of the rotating electrical machine MG reaches zero, and thus, the rotating electrical machine MG goes into a state in which the rotating electrical machine MG rotates by inertia, but does not output torque.

In addition, in addition to such rotating electrical machine stop control, at least one of engagement disengagement control that brings the first engagement device CL1 into a disengaged state and neutral control that brings the state of the transmission TM into a neutral state in which drive power is not transmitted may be performed. By performing the neutral control, power transmission from the rotating electrical machine MG to the wheels W is interrupted. Therefore, even when the state of the rotating electrical machine MG goes into a negative torque abnormality, unstable traveling of the vehicle can be highly reliably avoided. In addition, when the engagement disengagement control is performed, power transmission between the internal combustion engine ENG and the rotating electrical machine MG is interrupted. Therefore, an influence of the state of the rotating electrical machine MG being a negative torque abnormality can be avoided from being exerted on the internal combustion engine ENG.

Furthermore, when the engagement disengagement control is performed, internal combustion engine zero-torque control may be performed that controls the internal combustion engine ENG such that internal combustion engine actual torque which is the actual torque of the internal combustion engine ENG reaches zero.

If the determining part 16 determines at STEP2 that the MG actual rotational speed Nm is less than or equal to the rotational speed threshold value THn, the determining part 16 determines whether the MG target torque Tmt is greater than or equal to zero (STEP20).

On the other hand, if it is determined at STEP2 that the MG actual rotational speed Nm is greater than the rotational speed threshold value THn, the determination of a state of the rotating electrical machine MG ends.

If the determining part 16 determines that the MG target torque Tmt is greater than or equal to zero, the determining part 16 determines whether the MG actual torque Tm is smaller than the second threshold value THt2 (STEP21).

On the other hand, if the determining part 16 determines that the MG target torque Tmt is smaller than zero, the determining part 16 determines whether the MG actual torque Tm is smaller than the fourth threshold value THt4 (STEP22).

If the determining part 16 determines at STEP21 that the MG actual torque Tm is smaller than the second threshold value THt2, or determines at STEP22 that the MG actual torque Tm is smaller than the fourth threshold value THt4, the determining part 16 makes a tentative determination of a negative torque abnormality (STEP23).

On the other hand, if the determining part 16 determines at STEP21 that the MG actual torque Tm is greater than or equal to the second threshold value THt2, or determines at STEP22 that the MG actual torque Tm is greater than or equal to the fourth threshold value THt4, the determining part 16 ends the determination of a state of the rotating electrical machine MG.

Subsequently, the determining part 16 determines whether the period of time $\Delta t$ has elapsed from when the tentative determination of a negative torque abnormality is initially made (STEP24). If the determining part 16 determines that the period of time $\Delta t$ has not elapsed from when the tentative determination of a negative torque abnormality is initially made, the determining part 16 returns to STEP1 and determines a state of the rotating electrical machine MG. On the other hand, if the "tentative determination of a negative torque abnormality" state continues even after the period of time $\Delta t$ has elapsed from when the tentative determination of a negative torque abnormality is initially made, the determining part 16 makes a final determination of a negative torque abnormality (STEP25).

After making the final determination of a negative torque abnormality, the determining part 16 performs rotating electrical machine stop control that stops the rotating electrical machine MG (STEP26). The rotating electrical machine stop control performed at this STEP26 is the same as the rotating electrical machine stop control performed at STEP16, and thus, a detailed description thereof is omitted. In addition, in this case, too, in addition to the rotating electrical machine stop control, at least one of engagement disengagement control and neutral control may be performed. Furthermore, when the engagement disengagement control is performed, internal combustion engine zero-torque control may be performed.

4-3. Time Chart

Figure 7:
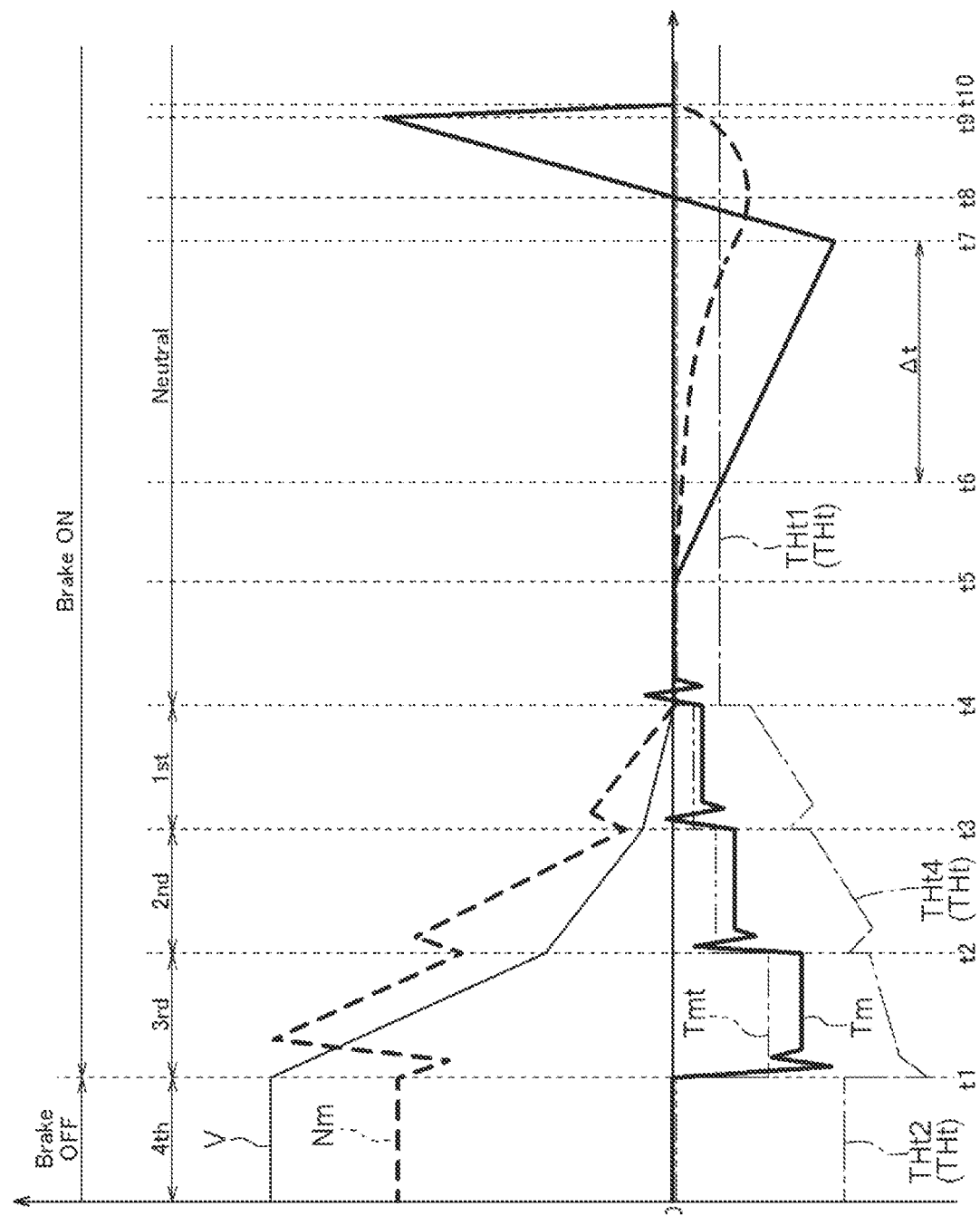
FIG. 7 is a time chart showing a determination of a state of the rotating electrical machine by the determining part.

FIG. 7 shows a time chart for an example of a determination of a state of the rotating electrical machine MG by the determining part 16. FIG. 7 shows an example case in which after the vehicle decelerates by activation of wheel brakes during forward traveling and the transmission TM goes into a neutral state, an abnormality has occurred in which the rotating electrical machine MG outputs a negative torque different from MG target torque Tmt. Note that "4th" to "1st" in FIG. 7 respectively indicate a fourth shift speed to a first shift speed formed by the transmission TM, and the gear ratio increases from the fourth shift speed to the first shift speed.

As shown in FIG. 7, before time t1, the vehicle is traveling forward with the fourth shift speed formed by the transmission TM. At this time, the MG actual rotational speed Nm is maintained at a constant positive value, and the speed of the vehicle (hereinafter, referred to as "vehicle speed") V is also maintained at a constant positive value. In addition, the MG target torque Tmt is maintained at zero, and accordingly, the MG actual torque Tm is also maintained at zero.

As such, before time t1, the MG actual rotational speed Nm is greater than or equal to zero and the MG target torque Tmt is greater than or equal to zero, and thus, the torque threshold value THt is set to the second threshold value THt2. Note that before time t1, the MG actual rotational speed Nm is maintained constant, and thus, the second threshold value THt2 does not change.

At and after time t1, the wheel brakes of the vehicle are activated. By this, the vehicle speed V decreases, and accordingly, downshifting control is performed. In this example, the third shift speed is formed during a period from time t1 to t2, the second shift speed is formed during a period from time t2 to t3, and the first shift speed is formed during a period from time t3 to t4. Then, at and after t4, the transmission TM goes into a neutral state in which a shift speed is not formed. Note that the wheel brakes continue to be in an activation state at and after time t1.

Over a period from time t1 to t4, the MG actual rotational speed Nm decreases in a stepwise manner and reaches zero at time t4. Furthermore, the vehicle speed V also gradually decreases over the period from time t1 to t4 and reaches zero at time t4. In addition, the MG target torque Tmt reaches a negative value at time t1, increases in a stepwise manner over the period from time t1 to t4, and reaches zero at time t4. Accordingly, the MG actual torque Tm also reaches a negative value at time t1, increases in a stepwise manner over the period from time t1 to t4, and reaches zero after passing time t4.

As such, during the period from time t1 to t4, the MG actual rotational speed Nm is greater than or equal to zero and the MG target torque Tmt is smaller than zero, and thus, the torque threshold value THt is set to the fourth threshold value THt4. Over the period from time t1 to t4, the MG actual rotational speed Nm decreases and the MG target torque Tmt increases, and thus, the fourth threshold value THt4 increases.

During a period from time t4 to t5, the MG actual rotational speed Nm and the MG target torque Tmt are maintained at zero. As such, during the period from time t4 to t5, the MG actual rotational speed Nm is greater than or equal to zero and the MG target torque Tmt is greater than or equal to zero, and thus, the torque threshold value THt is set to the second threshold value THt2. Note, however, that since the MG actual rotational speed Nm is zero, in practice, the second threshold value THt2 is equal to the first threshold value THt1.

At time t5, some kind of failure has occurred in the rotating electrical machine MG, the inverter device INV, etc., and despite the fact that the MG target torque Tmt is zero, the MG actual torque Tm starts to decrease from zero. Accordingly, the MG actual rotational speed Nm also starts to decrease from zero. At this time, the MG actual rotational speed Nm is smaller than zero and the MG target torque Tmt is greater than or equal to zero, and thus, the torque threshold value THt is set to the first threshold value THt1.

Then, the MG actual torque Tm further decreases, and at a point in time when time t6 has passed, the MG actual torque Tm becomes smaller than the first threshold value THt1. Hence, the above-described tentative determination of a negative torque abnormality is made at the point in time when time t6 has passed. Then, at a point in time (time t7) when a period of time Δt has elapsed without resolving the tentative determination of a negative torque abnormality before the period of time Δt has elapsed from when the tentative determination of a negative torque abnormality is initially made, the above-described final determination of a negative torque abnormality is made.

Hence, at time t7, the above-described rotating electrical machine stop control starts. Here, as the rotating electrical machine stop control, active short-circuit control is performed. Accordingly, torque in a direction in which the rotation of the rotating electrical machine MG decelerates is generated, and thus, the MG actual torque Tm starts to increase at time t7. Then, at a point in time when time t8 has passed, the MG actual torque Tm reaches a positive value. Then, the further increased MG actual torque Tm starts to decrease at time t9 and reaches zero at time t10. In addition, the MG actual rotational speed Nm starts to increase at time t8 and reaches zero at time t10. By this, even when the state of the rotating electrical machine MG goes into a negative torque abnormality, the state of the vehicle can be stabilized.

Note that in this example, the transmission TM is already in a neutral state at a point in time when it is determined that the state of the rotating electrical machine MG has gone into a negative torque abnormality, and thus, neutral control is not performed. On the other hand, when the state of the rotating electrical machine MG has gone into a negative torque abnormality during traveling of the vehicle, etc., with a shift speed formed by the transmission TM, it is desirable to immediately perform neutral control. In addition, in this case, it is desirable to perform engagement disengagement control and internal combustion engine zero-torque control as necessary.

OTHER EMBODIMENTS (1) The above-described embodiment describes, as an example, a configuration in which when it is determined that the state of the rotating electrical machine MG has gone into a negative torque abnormality, rotating electrical machine stop control is performed. However, the configuration is not limited thereto and may be such that when it is determined that the state of the rotating electrical machine MG has gone into a negative torque abnormality, other control is performed. For example, the configuration may be such that instead of performing rotating electrical machine stop control, neutral control that brings the transmission TM into a neutral state is performed.

(2) The above-described embodiment describes, as an example, a configuration in which the first threshold value THt1 is set to a constant value that does not change depending on the MG actual rotational speed Nm and the MG target torque Tmt. However, the configuration is not limited thereto, and the first threshold value THt1 may be set to a value that changes depending on at least one of the MG actual rotational speed Nm and the MG target torque Tmt.

(3) The above-described embodiment describes, as an example, a configuration in which the second threshold value THt2 is set to a value that does not change depending on the MG target torque Tmt, but decreases as the MG actual rotational speed Nm increases. However, the configuration is not limited thereto, and for example, the second threshold value THt2 may be set to a constant value that does not change depending on the MG actual rotational speed Nm and the MG target torque Tmt. Alternatively, the second threshold value THt2 may be set to a value that does not change depending on the MG actual rotational speed Nm, but changes depending on the MG target torque Tmt. In addition, the above-described embodiment describes, as an example, a configuration in which the second threshold value THt2 is proportional to the MG actual rotational speed Nm. However, the configuration is not limited thereto and may be such that the second threshold value THt2 is set to a value that changes instead of being proportional to the MG actual rotational speed Nm.

(4) The above-described embodiment describes, as an example, a configuration in which the third threshold value THt3 is set to a value that does not change depending on the MG actual rotational speed Nm, but decreases as the MG target torque Tmt decreases. However, the configuration is not limited thereto, and for example, the third threshold value THt3 may be set to a constant value that does not change depending on the MG actual rotational speed Nm and the MG target torque Tmt. Alternatively, the third threshold value THt3 may be set to a value that does not change depending on the MG target torque Tmt, but changes depending on the MG actual rotational speed Nm. In addition, the above-described embodiment describes, as an example, a configuration in which the third threshold value THt3 is proportional to the MG target torque Tmt. However, the configuration is not limited thereto and may be such that the third threshold value THt3 is set to a value that changes instead of being proportional to the MG target torque Tmt.

(5) The above-described embodiment describes, as an example, a configuration in which the fourth threshold value THt4 is set to a value that decreases as the MG target torque Tmt decreases and that decreases as the MG actual rotational speed Nm increases. However, the configuration is not limited thereto and may be such that, for example, the fourth threshold value THt4 is set to a constant value that does not change depending on the MG target torque Tmt and the MG actual rotational speed Nm. Alternatively, the fourth threshold value THt4 may be set to a value that does not change depending on the MG target torque Tmt, but changes depending on the MG actual rotational speed Nm, or a value that does not change depending on the MG actual rotational speed Nm, but changes depending on the MG target torque Tmt. In addition, the above-described embodiment describes, as an example, a configuration in which the fourth threshold value THt4 is proportional to the MG target torque Tmt and the MG actual rotational speed Nm. However, the configuration is not limited thereto and may be such that the fourth threshold value THt4 is set to a value that changes instead of being proportional to at least one of the MG target torque Tmt and the MG actual rotational speed Nm.

(6) The above-described embodiment describes, as an example, a configuration in which the rotational speed threshold value THn is set and when the MG actual rotational speed Nm is greater than or equal to the rotational speed threshold value THn, a state of the rotating electrical machine MG is not determined. However, the configuration is not limited thereto and may be such that the rotational speed threshold value THn is not set.

(7) The above-described embodiment describes, as an example, a configuration in which a final determination of a negative torque abnormality is made when the period of time Δt has elapsed from when a tentative determination of a negative torque abnormality is initially made. However, the configuration is not limited thereto and may be such that a final determination of a negative torque abnormality is made without making a tentative determination of a negative torque abnormality.

(8) The above-described embodiment describes, as an example, a configuration in which the transmission TM is a stepped transmission having a shift speed determined based on the states of engagement of the second engagement devices CL2. However, the configuration is not limited thereto and the transmission TM may be a continuously variable transmission. In this case, engagement devices that switch between forward, reverse, and neutral states correspond to the second engagement devices CL2.

(9) The above-described embodiment describes, as an example, a configuration in which the vehicle drive device 1 is mounted on a hybrid vehicle that uses the internal combustion engine ENG and the rotating electrical machine MG as its drive power sources. However, the configuration is not limited thereto and may be such that, for example, the vehicle drive device 1 is mounted on an electric car that uses only the rotating electrical machine MG as its drive power source. In this configuration, the transmission TM may be provided between the rotating electrical machine MG and the wheels W in the power transmission path or the transmission TM may not be provided.

(10) Note that a configuration disclosed in each of the above-described embodiments can also be applied in combination with a configuration disclosed in another embodiment as long as a contradiction does not arise. For other configurations, too, the embodiments disclosed in this specification are in all respects merely illustrative. Thus, various modifications can be made therein as appropriate without departing from the true spirit and scope of the present disclosure.

Summary of the Above-Described Embodiments

A summary of a control device (10) for a vehicle drive device (1) described above will be described below.

A control device (10) for a vehicle drive device (1) is
the control device (10) whose control target is the vehicle drive device (1) including a rotating electrical machine (MG), the control device (10) including:
an actual rotational speed obtaining part (14) that obtains an actual rotational speed (Nm), the actual rotational speed (Nm) being an actual rotational speed of the rotating electrical machine (MG);
an actual torque obtaining part (15) that obtains actual torque (Tm), the actual torque (Tm) being actual torque of the rotating electrical machine (MG); and
a determining part (16) that determines a state of the rotating electrical machine (MG), and
the determining part (16) determines that the state of the rotating electrical machine (MG) is a negative torque abnormality, when the actual torque (Tm) has a negative value smaller than a torque threshold value (THt) set based on a relationship between the actual rotational speed (Nm) and target torque (Tmt) of the rotating electrical machine (MG).

According to this configuration, the torque threshold value (THt) for determining a state of the rotating electrical machine (MG) is set based on a relationship between the actual rotational speed (Nm) and target torque (Tmt) of the rotating electrical machine (MG). Hence, whatever the values of the actual rotational speed (Nm) and target torque (Tmt) of the rotating electrical machine (MG), a negative torque abnormality can be appropriately determined based on the actual rotational speed (Nm) and target torque (Tmt) of the rotating electrical machine (MG). Therefore, generation of a negative torque that may cause unstable traveling of the vehicle in the rotating electrical machine (MG) can be appropriately determined.

Here, it is preferred that the determining part (16) perform rotating electrical machine stop control that stops the rotating electrical machine (MG), when the determining part (16) determines that the state of the rotating electrical machine (MG) is the negative torque abnormality.

According to this configuration, when it is determined that the state of the rotating electrical machine (MG) is a negative torque abnormality, drive power transmitted from the rotating electrical machine (MG) to the wheels (W) can be reduced. Therefore, even when an unintended negative torque is generated in the rotating electrical machine (MG), unstable traveling of the vehicle can be avoided.

A control device (10) for a vehicle drive device (1) is
the control device (10) whose control target is the vehicle drive device (1) including a rotating electrical machine (MG), the control device (10) including:
an actual rotational speed obtaining part (14) that obtains an actual rotational speed (Nm), the actual rotational speed (Nm) being an actual rotational speed of the rotating electrical machine (MG);

an actual torque obtaining part (15) that obtains actual torque (Tm), the actual torque (Tm) being actual torque of the rotating electrical machine (MG); and a determining part (16) that determines a state of the rotating electrical machine (MG), and the determining part (16) performs rotating electrical machine stop control that stops the rotating electrical machine (MG), when the actual torque (Tm) has a negative value smaller than a torque threshold value (THt) set based on a relationship between the actual rotational speed (Nm) and target torque (Tmt) of the rotating electrical machine (MG).

According to this configuration, the torque threshold value (THt) for determining a state of the rotating electrical machine (MG) is set based on a relationship between the actual rotational speed (Nm) and target torque (Tmt) of the rotating electrical machine (MG). Hence, whatever the values of the actual rotational speed (Nm) and target torque (Tmt) of the rotating electrical machine (MG), generation of a negative torque that may cause unstable traveling of the vehicle in the rotating electrical machine (MG) can be appropriately determined based on the actual rotational speed (Nm) and target torque (Tmt) of the rotating electrical machine (MG). When the actual torque (Tm) of the rotating electrical machine (MG) has a negative value smaller than the torque threshold value (THt), rotating electrical machine stop control that stops the rotating electrical machine (MG) is performed. By this, drive power transmitted from the rotating electrical machine (MG) to the wheels (W) can be reduced. Therefore, even when an unintended negative torque is generated in the rotating electrical machine (MG), unstable traveling of the vehicle can be avoided.

Here, the vehicle drive device (1) further includes an inverter device (INV) that is connected to a direct-current power supply (BT) and connected to the rotating electrical machine (MG) to convert electric power between direct current of the direct-current power supply (BT) and multiphase alternating current of the rotating electrical machine (MG), the inverter device (INV) includes: a plurality of upper-stage-side switching elements (SWa) connected to a positive polarity side of the direct-current power supply (BT); and a plurality of lower-stage-side switching elements (SWb) connected to a negative polarity side of the direct-current power supply (BT), and in the rotating electrical machine stop control, at least one of active short-circuit control that brings either all of the plurality of upper-stage-side switching elements (SWa) or all of the plurality of lower-stage-side switching elements (SWb) into an on state and brings other ones into an off state, shutdown control that brings all of the plurality of upper-stage-side switching elements (SWa) and the plurality of lower-stage-side switching elements (SWb) into an off state, and rotating electrical machine zero-torque control that controls the rotating electrical machine (MG) such that the actual torque (Tm) reaches zero is performed.

In the active short-circuit control or the shutdown control, torque in a direction in which the rotation of the rotating electrical machine (MG) decelerates is generated, and in the rotating electrical machine torque control, the actual torque (Tm) of the rotating electrical machine (MG) approaches zero. According to this configuration, in the rotating electrical machine stop control, at least one of the active short-circuit control, shutdown control, and rotating electrical machine zero-torque control is performed. Hence, drive power transmitted from the rotating electrical machine (MG) to the wheels (W) can be appropriately reduced. Therefore, even when an unintended negative torque is generated in the rotating electrical machine (MG), unstable traveling of the vehicle can be appropriately avoided.

In addition, the control device (10) further includes: an input member (I) drive-coupled to an internal combustion engine (ENG): an output member (O) drive-coupled to wheels (W): an engagement device (CL1); and a transmission (TM), in a power transmission path connecting the input member (I) to the output member (O), the engagement device (CL1), the rotating electrical machine (MG), and the transmission (TM) are provided in this order from an internal combustion engine (ENG) side, and when the actual torque (Tm) has a negative value smaller than the torque threshold value (THt), the determining part (16) performs, in addition to the rotating electrical machine stop control, at least one of engagement disengagement control that brings the engagement device (CL1) into a disengaged state and neutral control that brings a state of the transmission (TM) into a neutral state in which drive power is not transmitted.

According to this configuration, when engagement disengagement control is performed, power transmission between the internal combustion engine (ENG) and the rotating electrical machine (MG) is interrupted. Therefore, an influence of a negative torque generated in the rotating electrical machine (MG) can be avoided from being exerted on the internal combustion engine (ENG).

In addition, according to this configuration, when neutral control is performed, power transmission from the rotating electrical machine (MG) to the wheels (W) is interrupted. Therefore, even when an unintended negative torque is generated in the rotating electrical machine (MG), unstable traveling of the vehicle can be highly reliably avoided.

In addition, when the determining part (16) performs the engagement disengagement control, the determining part (16) performs internal combustion engine zero-torque control that controls the internal combustion engine (ENG) such that internal combustion engine actual torque reaches zero, the internal combustion engine actual torque being actual torque of the internal combustion engine (ENG).

When engagement disengagement control is performed, power transmission between the internal combustion engine (ENG) and the rotating electrical machine (MG) is interrupted, and thus, a load on the internal combustion engine (ENG) decreases, which may significantly increase the rotational speed of the internal combustion engine (ENG). According to this configuration, when engagement disengagement control is performed, internal combustion engine zero-torque control is performed that controls the internal combustion engine (ENG) such that the internal combustion engine actual torque reaches zero. Therefore, even when power transmission between the internal combustion engine (ENG) and the rotating electrical machine (MG) is interrupted, a significant increase in the rotational speed of the internal combustion engine (ENG) can be avoided.

In addition, it is preferred that the torque threshold value (THt)

decrease as the actual rotational speed (Nm) increases when the actual rotational speed (Nm) is positive, and not change depending on the actual rotational speed (Nm) when the actual rotational speed (Nm) is negative.

When the actual rotational speed (Nm) of the rotating electrical machine (MG) is positive, i.e., when the rotating electrical machine (MG) is rotating in a forward direction, reverse rotation of the rotating electrical machine (MG) is more likely to occur as the actual rotational speed (Nm) decreases, and the amount of change in rotational speed before reverse rotation occurs increases as the actual rotational speed (Nm) increases and thus reverse rotation of the rotating electrical machine (MG) becomes difficult to occur. According to this configuration, the torque threshold value (THt) is set such that when the actual rotational speed (Nm) is positive, the torque threshold value (THt) decreases as the actual rotational speed (Nm) increases so that the torque threshold value (THt) has a value having more margin when the actual rotational speed (Nm) is high than when the actual rotational speed (Nm) is low. Therefore, when the actual rotational speed (Nm) is positive, a negative torque abnormality can be appropriately determined.

In addition, when the actual rotational speed (Nm) of the rotating electrical machine (MG) is negative, i.e., when the rotating electrical machine (MG) is rotating in a reverse direction, unintended acceleration of the rotational speed of the rotating electrical machine (MG) in the reverse direction leads to acceleration of the vehicle in a backward direction and thus is not desirable. According to this configuration, in a case in which the actual rotational speed (Nm) is negative, regardless of the magnitude of the actual rotational speed (Nm), when negative torque of the rotating electrical machine (MG) exceeds a specified torque threshold value (THt), it is determined that the state of the rotating electrical machine (MG) is a negative torque abnormality. Therefore, when the actual rotational speed (Nm) is negative, too, a negative torque abnormality can be appropriately determined.

In addition, it is preferred that the torque threshold value (THt)
not change depending on the target torque (Tmt) of the rotating electrical machine (MG) when the target torque (Tmt) is positive, and
decrease as the target torque (Tmt) of the rotating electrical machine (MG) decreases when the target torque (Tmt) is negative.

When the target torque (Tmt) of the rotating electrical machine (MG) is positive, the actual torque (Tm) becoming a negative value in contrast to the target torque (Tmt) leads to, for example, that despite the intention to accelerate the vehicle, the vehicle unintentionally decelerates or travels backward, and thus is not desirable. According to this configuration, in a case in which the target torque (Tmt) is positive, regardless of the magnitude of the target torque (Tmt), when negative torque of the rotating electrical machine (MG) exceeds a specified torque threshold value (THt), it is determined that the state of the rotating electrical machine (MG) is a negative torque abnormality. Therefore, when the target torque (Tmt) is positive, a negative torque abnormality can be appropriately determined.

In addition, when the target torque (Tmt) of the rotating electrical machine (MG) is negative, an increase of the actual torque (Tm) in a negative direction with respect to the target torque (Tmt) leads to, for example, that despite the intention to decelerate the vehicle or to allow the vehicle to travel backward, the deceleration unintentionally increases or the vehicle unintentionally accelerates in a backward direction, and thus is not desirable. According to this configuration, when the target torque (Tmt) is negative, the torque threshold value (THt) decreases as the target torque (Tmt) decreases. When the actual torque (Tm) is increased to a certain level or more in the negative direction with respect to the target torque (Tmt), it is determined that the state of the rotating electrical machine (MG) is a negative torque abnormality. Therefore, when the target torque (Tmt) is negative, too, a negative torque abnormality can be appropriately determined.

In addition, it is preferred that the determining part (16) not determine a state of the rotating electrical machine (MG) when the actual rotational speed (Nm) is greater than or equal to a specified rotational speed threshold value (THn).

If the actual rotational speed (Nm) of the rotating electrical machine (MG) is somewhat high, then even when an unintended negative torque is generated, there is a low possibility of the rotating electrical machine (MG) rotating in a reverse direction. According to this configuration, when the actual rotational speed (Nm) is greater than or equal to the rotational speed threshold value (THn), a state of the rotating electrical machine (MG) is not determined. By this, a determination of a state of the rotating electrical machine (MG) even for a case of a low likelihood of reverse rotation of the rotating electrical machine (MG) is not made, and thus, a computation load on the determining part (16) can be reduced.

INDUSTRIAL APPLICABILITY

A technique according to the present disclosure can be used in a control device whose control target is a vehicle drive device including a rotating electrical machine.

REFERENCE SIGNS LIST

1: Vehicle drive device, 10: Control device, 14: Actual rotational speed obtaining part, 15: Actual torque obtaining part, 16: Determining part, 30: Instruction device, ENG: Internal combustion engine, MG: Rotating electrical machine, I: Input shaft (input member), O: Output shaft (output member), TM: Transmission, CL1: First engagement device (engagement device), W: Wheel, Nm: MG actual rotational speed (actual rotational speed), Tm: MG actual torque (actual torque), Tmt: MG target torque (target torque), and THt: Torque threshold value

The invention claimed is:
1. A control device for a vehicle drive device, a control target for the control device being the vehicle drive device including a rotating electrical machine, the control device comprising:
an actual rotational speed obtaining part that obtains an actual rotational speed, the actual rotational speed being an actual rotational speed of the rotating electrical machine;
an actual torque obtaining part that obtains actual torque, the actual torque being actual torque of the rotating electrical machine; and
a determining part that determines a state of the rotating electrical machine,
wherein
the determining part determines that the state of the rotating electrical machine is a negative torque abnormality, when the actual torque has a negative value smaller than a torque threshold value set based on a relationship between the actual rotational speed and target torque of the rotating electrical machine,
wherein the torque threshold value
decreases as the actual rotational speed increases when the actual rotational speed is positive, and
does not change depending on the actual rotational speed when the actual rotational speed is negative.

2. The control device for a vehicle drive device according to claim 1, wherein the determining part performs rotating electrical machine stop control that stops the rotating electrical machine, when the determining part determines that the state of the rotating electrical machine is the negative torque abnormality.

3. The control device for a vehicle drive device according to claim 2, wherein
the vehicle drive device further includes an inverter device that is connected to a direct-current power supply and connected to the rotating electrical machine to convert electric power between direct current of the direct-current power supply and multiphase alternating current of the rotating electrical machine,
the inverter device includes: a plurality of upper-stage-side switching elements connected to a positive polarity side of the direct-current power supply; and a plurality of lower-stage-side switching elements connected to a negative polarity side of the direct-current power supply, and
in the rotating electrical machine stop control,
at least one of
active short-circuit control that brings either all of the plurality of upper-stage-side switching elements or all of the plurality of lower-stage-side switching elements into an on state and brings other ones into an off state,
shutdown control that brings all of the plurality of upper-stage-side switching elements and the plurality of lower-stage-side switching elements into an off state, and
rotating electrical machine zero-torque control that controls the rotating electrical machine such that the actual torque reaches zero is performed.

4. The control device for a vehicle drive device according to claim 2, further comprising: an input member drive-coupled to an internal combustion engine; an output member drive-coupled to wheels; an engagement device; and a transmission,
wherein
in a power transmission path connecting the input member to the output member, the engagement device, the rotating electrical machine, and the transmission are provided in this order from an internal combustion engine side, and
when the actual torque has a negative value smaller than the torque threshold value, the determining part performs, in addition to the rotating electrical machine stop control, at least one of engagement disengagement control that brings the engagement device into a disengaged state and neutral control that brings a state of the transmission into a neutral state in which drive power is not transmitted.

5. The control device for a vehicle drive device according to claim 4, wherein when the determining part performs the engagement disengagement control, the determining part performs internal combustion engine zero-torque control that controls the internal combustion engine such that internal combustion engine actual torque reaches zero, the internal combustion engine actual torque being actual torque of the internal combustion engine.

6. The control device for a vehicle drive device according to claim 1, wherein the torque threshold value
does not change depending on the target torque of the rotating electrical machine when the target torque is positive, and
decreases as the target torque of the rotating electrical machine decreases when the target torque is negative.

7. The control device for a vehicle drive device according to claim 1, wherein the determining part does not determine a state of the rotating electrical machine when the actual rotational speed is greater than or equal to a specified rotational speed threshold value.

8. The control device for a vehicle drive device according to claim 2, wherein the torque threshold value
decreases as the actual rotational speed increases when the actual rotational speed is positive, and
does not change depending on the actual rotational speed when the actual rotational speed is negative.

9. The control device for a vehicle drive device according to claim 2, wherein the torque threshold value
does not change depending on the target torque of the rotating electrical machine when the target torque is positive, and
decreases as the target torque of the rotating electrical machine decreases when the target torque is negative.

10. The control device for a vehicle drive device according to claim 2, wherein the determining part does not determine a state of the rotating electrical machine when the actual rotational speed is greater than or equal to a specified rotational speed threshold value.

11. The control device for a vehicle drive device according to claim 1, wherein the torque threshold value
does not change depending on the target torque of the rotating electrical machine when the target torque is positive, and
decreases as the target torque of the rotating electrical machine decreases when the target torque is negative.

12. The control device for a vehicle drive device according to claim 1, wherein the determining part does not determine a state of the rotating electrical machine when the actual rotational speed is greater than or equal to a specified rotational speed threshold value.

13. A control device for a vehicle drive device, a control target for the control device being the vehicle drive device including a rotating electrical machine, the control device comprising:
an actual rotational speed obtaining part that obtains an actual rotational speed, the actual rotational speed being an actual rotational speed of the rotating electrical machine;
an actual torque obtaining part that obtains actual torque, the actual torque being actual torque of the rotating electrical machine; and
a determining part that determines a state of the rotating electrical machine,
wherein
the determining part performs rotating electrical machine stop control that stops the rotating electrical machine, when the actual torque has a negative value smaller than a torque threshold value set based on a relationship between the actual rotational speed and target torque of the rotating electrical machine,
wherein the torque threshold value
decreases as the actual rotational speed increases when the actual rotational speed is positive, and
does not change depending on the actual rotational speed when the actual rotational speed is negative.

14. The control device for a vehicle drive device according to claim 13, wherein
the vehicle drive device further includes an inverter device that is connected to a direct-current power supply and connected to the rotating electrical machine to convert electric power between direct current of the direct-current power supply and multiphase alternating current of the rotating electrical machine, the inverter device includes: a plurality of upper-stage-side switching elements connected to a positive polarity side of the direct-current power supply; and a plurality of lower-stage-side switching elements connected to a negative polarity side of the direct-current power supply, and in the rotating electrical machine stop control, at least one of active short-circuit control that brings either all of the plurality of upper-stage-side switching elements or all of the plurality of lower-stage-side switching elements into an on state and brings other ones into an off state, shutdown control that brings all of the plurality of upper-stage-side switching elements and the plurality of lower-stage-side switching elements into an off state, and rotating electrical machine zero-torque control that controls the rotating electrical machine such that the actual torque reaches zero is performed.

15. The control device for a vehicle drive device according to claim 13, further comprising: an input member drive-coupled to an internal combustion engine; an output member drive-coupled to wheels; an engagement device; and a transmission, wherein in a power transmission path connecting the input member to the output member, the engagement device, the rotating electrical machine, and the transmission are provided in this order from an internal combustion engine side, and when the actual torque has a negative value smaller than the torque threshold value, the determining part performs, in addition to the rotating electrical machine stop control, at least one of engagement disengagement control that brings the engagement device into a disengaged state and neutral control that brings a state of the transmission into a neutral state in which drive power is not transmitted.

16. The control device for a vehicle drive device according to claim 15, wherein when the determining part performs the engagement disengagement control, the determining part performs internal combustion engine zero-torque control that controls the internal combustion engine such that internal combustion engine actual torque reaches zero, the internal combustion engine actual torque being actual torque of the internal combustion engine.

17. The control device for a vehicle drive device according to claim 13, wherein the torque threshold value does not change depending on the target torque of the rotating electrical machine when the target torque is positive, and decreases as the target torque of the rotating electrical machine decreases when the target torque is negative.

18. The control device for a vehicle drive device according to claim 13, wherein the determining part does not determine a state of the rotating electrical machine when the actual rotational speed is greater than or equal to a specified rotational speed threshold value.

* * * * *